US008707269B1

(12) United States Patent
Kondreddy et al.

(10) Patent No.: US 8,707,269 B1
(45) Date of Patent: Apr. 22, 2014

(54) DYNAMIC TEST GENERATION BASED ON ENTITIES IN A GRAPHICAL ENVIRONMENT

(75) Inventors: Suman Kumar Kondreddy, Framingham, MA (US); Peter S Szpak, Newton, MA (US)

(73) Assignee: The Mathworks, Inc., Natick, MA (US)

(*) Notice: Subject to any disclaimer, the term of this patent is extended or adjusted under 35 U.S.C. 154(b) by 1531 days.

(21) Appl. No.: 12/018,405

(22) Filed: Jan. 23, 2008

Related U.S. Application Data

(63) Continuation-in-part of application No. 11/942,150, filed on Nov. 19, 2007, now abandoned.

(51) Int. Cl.
*G06F 9/44* (2006.01)
*G06F 11/00* (2006.01)
*G05B 13/02* (2006.01)

(52) U.S. Cl.
USPC ............. 717/125; 700/29; 714/38.1; 717/105

(58) Field of Classification Search
USPC ........................................................ 717/125
See application file for complete search history.

(56) References Cited

U.S. PATENT DOCUMENTS

| 7,024,631 | B1* | 4/2006 | Hudson et al. ................ 715/763 |
| 7,441,233 | B1* | 10/2008 | Orndorff et al. .............. 717/125 |
| 7,529,990 | B2* | 5/2009 | Haggerty ...................... 714/724 |
| 7,694,241 | B1* | 4/2010 | Jadcherla et al. ............. 716/127 |
| 7,735,066 | B1* | 6/2010 | Myers et al. .................. 717/125 |
| 2005/0108689 | A1* | 5/2005 | Hooper et al. ................ 717/135 |
| 2006/0005170 | A1* | 1/2006 | Rosaria et al. ............... 717/126 |
| 2006/0026464 | A1* | 2/2006 | Atkin et al. .................... 714/38 |

OTHER PUBLICATIONS

Gupta et al., "An Obect-Oriented VLSI CAD Framework," IEEE, 1989, 10pg.*
Pomante, Luigi, "Exploiting Polymorphism in HW Design: a Case Study in the ATM Domain," ACM, 2004, 5pg.*

* cited by examiner

*Primary Examiner* — Ryan Coyer
(74) *Attorney, Agent, or Firm* — Harrity & Harrity, LLP

(57) ABSTRACT

A computing-device implemented method may include receiving an instruction and dynamically performing tests in a modeling environment in response to the instruction. The dynamically performing tests may include selecting a polymorphic entity, displaying a context menu associated with the polymorphic entity on a display, activating in the context menu a menu item that is linked to one of one or more requirements, generating the test, and performing the test to produce a test result.

23 Claims, 16 Drawing Sheets

| TEST CASE | RUN | STATUS | COMMENTS |
|---|---|---|---|
| check_maskdialog | Y | PASSED | |
| check_dto | N | PASSED | |
| check_mfunc | Y | FAILED | See log |
| check_edit_param | Y | PASSED | |
| check_codegen | Y | INCOMPLETE | |
| check_pmode | N | DID NOT RUN | Filtered out in requirements |

Fig. 13

DYNAMIC TEST GENERATION BASED ON ENTITIES IN A GRAPHICAL ENVIRONMENT

RELATED APPLICATION

This application claims priority from and is a continuation-in-part (CIP) of U.S. patent application Ser. No. 11/942,150, filed Nov. 19, 2007, and entitled "DYNAMIC TEST GENERATION BASED ON ENTITIES IN A GRAPHICAL ENVIRONMENT," the disclosure of which is incorporated herein by reference.

BACKGROUND INFORMATION

Models may be designed or constructed for simulating dynamic systems. In many instances, constructing such models involves validating a set of requirements for the models and eliminating errors that are associated with the models. Testing each requirement can be time consuming and/or painstaking.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

FIG. 13 shows an exemplary report from testing the scaling operator of FIG. 11;

DETAILED DESCRIPTION

Figure 1:
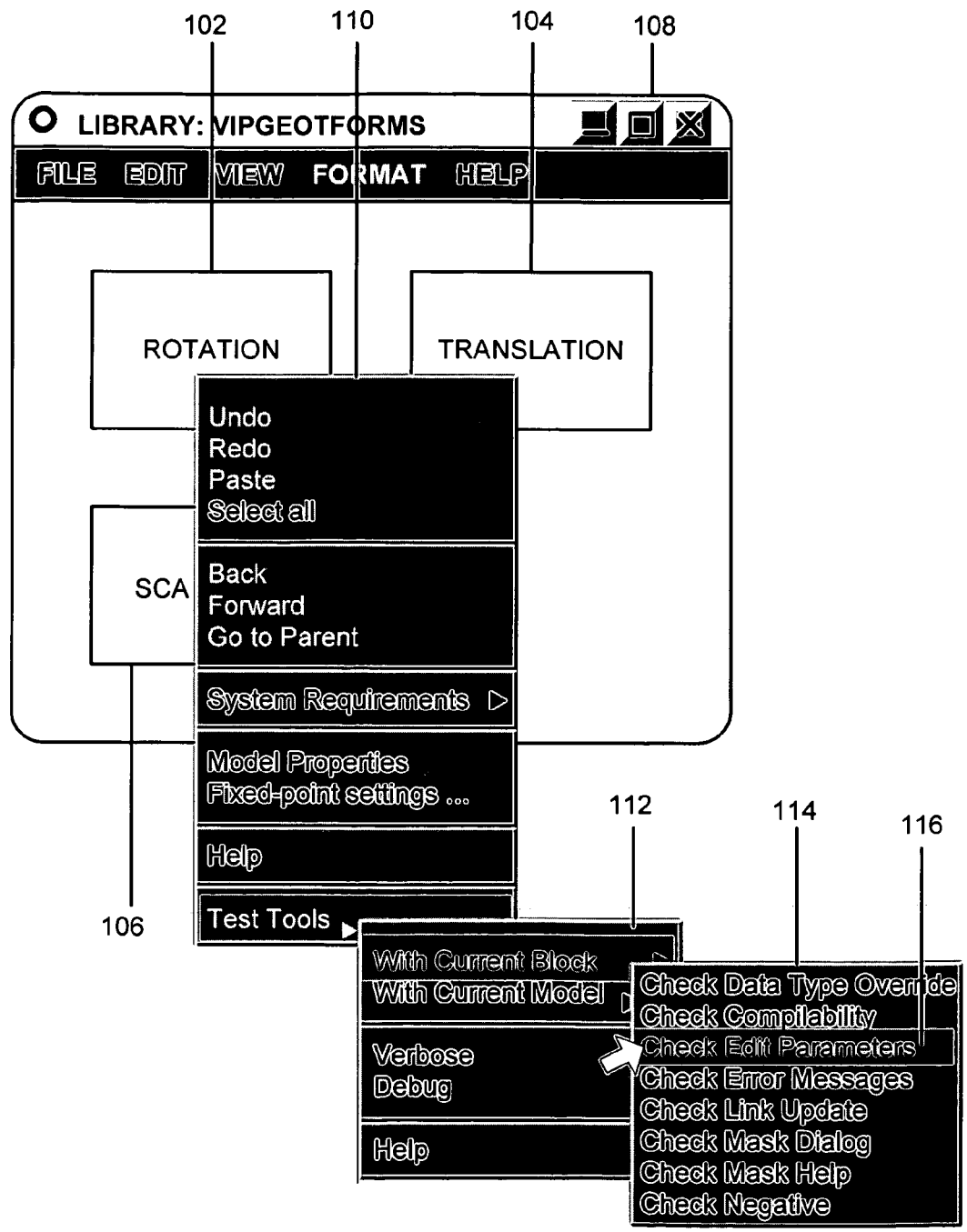
FIG. 1 is a diagram illustrating an overview of dynamic test generation based on entities in a graphical environment.

The following detailed description refers to the accompanying drawings. The same reference numbers in different drawings may identify the same or similar elements. Also, the following detailed description does not limit the invention.

The term "object," as used herein, may refer to one or more defined blocks of memory.

As used herein, the term "entity" may refer to an object in a simulation and modeling environment. An entity may include components (e.g., models, blocks, a user interface (UI) component, etc.) that are provided by a simulation and/or modeling environment to construct and/or to execute a model. An entity may be part of a model, a component, or another entity in the simulation and/or modeling environment. Examples of an entity may include a block, a portion of textual code, a model, an event generator, and/or a portion of data. Depending on context, an entity may be polymorphic, as defined below.

The term "polymorphism" or "polymorphic behavior," as used herein, may refer to the ability of an entity to adapt to its particular usage. For example, depending on the context of an entity, the entity may implement a method differently. In a time based block diagram model, a gain block may implement multiplication of an input signal by a constant factor. Depending on whether the input is a scalar or a vector, the multiplication may be implemented differently. For an input that is a scalar, the method for multiplication may involve a simple product of two input numbers. For an input that is a vector, the method may iterate over all the elements of the vector. Likewise, a block such as a gain block may be assigned a sample rate based on another block that is specified to execute with a given sample rate, and the method may perform a multiplication at specific times during the execution. Other polymorphic aspects may include data type (e.g., integer, float, string, complex number), etc.

As used herein, the term "a goal" may refer to an objective that may be mapped to a set of one or more requirements. As used herein, the set of "requirements" may define how the goal may be achieved.

The term "context," as used herein, may refer to a setting or a condition in which a piece of code executes in a given environment (e.g., an operating system, an application, etc.).

The term "context menu," as used herein, may refer to a graphical menu that provides a list of menu items for selection, depending on the context in which the context menu is activated. For example, right-clicking on a mouse when a cursor hovers over a document icon on a computer display may show a list of menu items for manipulating the document (e.g., open, edit, print, etc.), whereas right-clicking on the mouse when the cursor hovers over a folder icon on the computer display may show menu items for performing folder-related actions (e.g., search, arrange, etc.).

The term "requirement," as used herein, may refer to information that imposes one or more restrictions on an input and an output of a system.

The term "test case," as used herein, may refer to a description of one or more tests for a set of properties or parameters under a set of requirements.

The term "test," as used herein, may refer to a set of instructions for evaluating whether a particular set of input(s) generate a required set of output(s).

The term "dynamic test," as used herein, may refer to a test that may be generated and subsequently executed based on a test case.

The term "formal specification," as used herein, may refer to a constraint that is expressed in a logical language (e.g., a computer language, a standard generalized markup language (SGML), etc.). A requirement or a test case can be written as a formal specification.

Overview

Implementations described herein may provide a system that dynamically generates tests for entities in order to verify and/or validate computational and/or simulation tasks associated with the entities. In the following, tests may be generated in an authoring environment (e.g., C++ editor-compiler, Microsoft Visual Studio™) for designing models. The authoring environment may provide a language (e.g., graphical user interface (GUI) commands, text commands, etc.) that permits a user to generate tests in a language that is at a lower level (e.g., C, C++, etc.).

To generate the tests in the authoring environment for a polymorphic entity, test requirements and/or cases may be specified using a graphical user interface (GUI) or a file and by activating an item in a context menu for the entity. By using the GUI interface and the context menus, it may be possible to avoid complexities that are associated with manually configuring an environment for different test cases, including those related to polymorphic behavior of the entity.

For example, a test may be generated for a sum block (e.g., an entity that performs an addition) that inherits polymorphic behavior of an arithmetic block. The test may ensure that the sum block takes proper inputs (e.g., a single precision number and a double precision number) and generates correct outputs (e.g., a double precision number).

FIG. 1 illustrates an overview of dynamic test generation based on entities in a graphical environment. As illustrated, entities 102, 104 and 106 may be loaded into a graphical environment 108. To generate tests, provided that requirements and/or test cases are specified, a context menu 110, a submenu 112, a submenu 114, and a test item 116 may be activated by using an appropriate input/output device, such as a mouse or a keyboard. Activating test item 116 may cause graphical environment 108 to dynamically generate tests for verification and/or validation of entity 102.

By using the GUI interface and the context menus, it may be possible for users to avoid complexities that are generally associated with manually configuring test software and/or ensuring a thorough validation of proper input and output values for tested entities and polymorphic behavior of the entity. Furthermore, because the GUI interface and the context menus may allow a user to easily create and efficiently generate and perform dynamic tests. For record keeping and analyzing test results, graphical environment 108 may produce comprehensive reports and/or logs based on the dynamic tests.

Exemplary Device Configuration

Figure 2:
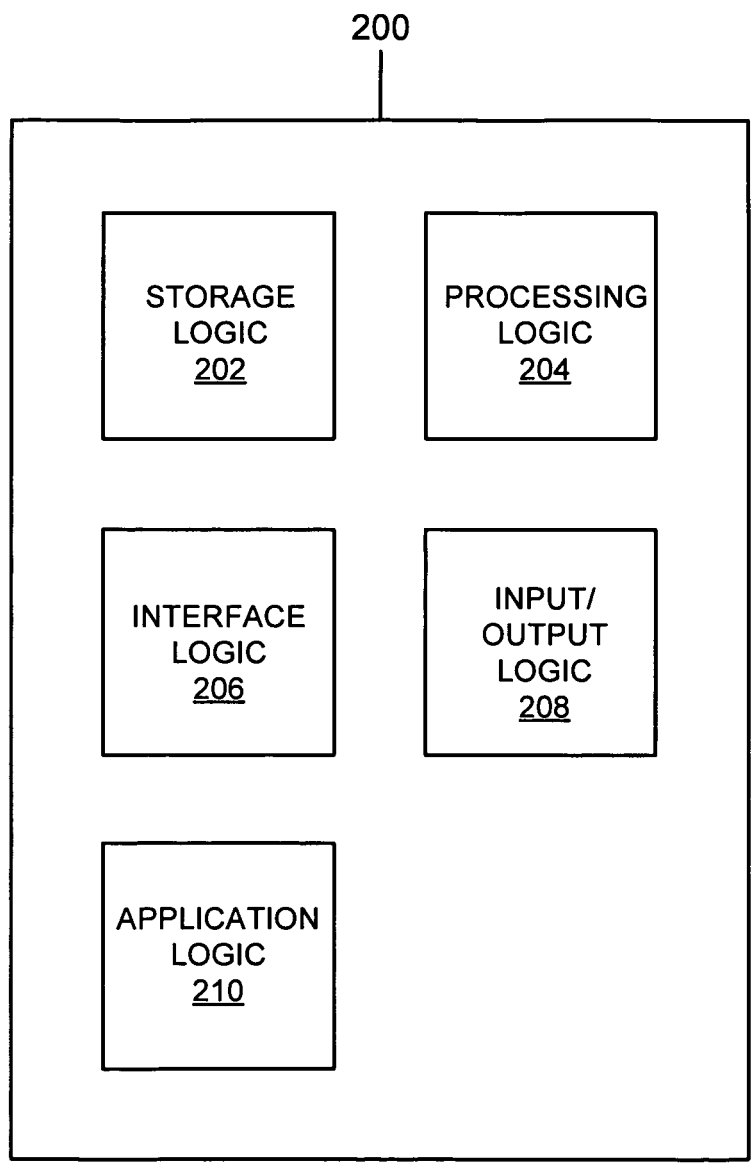
FIG. 2 is a functional block diagram of an exemplary device in which concepts described herein may be implemented.

FIG. 2 is a functional block diagram of an exemplary device 200 in which concepts described herein may be implemented. As shown, device 200 may include storage logic 202, processing logic 204, interface logic 206, input/output logic 208, and application logic 210. Logic may be implemented in hardware, software, or a combination of hardware and software. Depending on the implementation, device 200 may include additional, fewer, or different components than those depicted in FIG. 2.

Storage logic 202 may include static memory, such as read only memory (ROM), and/or dynamic memory, such as random access memory (RAM) or onboard cache, for storing data and machine-readable instructions. Storage logic 202 may also include storage devices, such as a floppy disk, a CD ROM, a CD read/write (R/W) disc, flash memory, as well as other types of storage devices. Storage logic 202 may be configured to store machine instructions and/or data as files and/or databases that provide an information repository for other logic, such as application logic 210.

Processing logic 204 may include one or more processors, microprocessors, and/or processing logic capable of controlling device 200. For example, processing logic 204 can include general purpose microprocessors and/or other types of processing devices, such as reduced instruction set processors, field programmable gate arrays (FPGAs), application specific integrated circuit (ASIC) devices, etc.

Interface logic 206 may include any mechanism that enables device 200 to communicate with other devices and/or systems, such as a modem, an Ethernet interface to a local area network (LAN), an interface/connection for connecting device 200 to other devices (e.g., a Bluetooth interface, etc.), communication logic (e.g., a Transmission and Control Protocol (TCP)/Internet Protocol (IP) stack, inetd in Unix, a telnetd in Unix, etc.), etc.

Input/output logic 208 may include a graphical display screen (e.g., a liquid crystal display (LCD), a light emitting diode (LED) display, etc.), a keyboard, a mouse, a speaker, a microphone, a Digital Video Disk (DVD) writer, a DVD reader, Universal Serial Bus (USB) lines, sensors, test equipment, device drivers, adapters, encoders, decoders, digital signal processing (DSP) software, etc.

Application logic 210 may include hardware and/or software based logic that provides a graphical environment for modeling dynamic systems and for performing simulations, and dynamically generating tests for entities. Application logic 210 may support modeling of linear and nonlinear systems in continuous time, discrete time, of a hybrid of the two. Application logic 210 may allow models to factor in variables that describe real-world phenomena, such as friction, air resistance, gear slippage, etc. In addition, application logic 210 may permit a dynamic generation of tests for validating computational and simulation tasks for many entities that are created or designed in application logic 210.

Application logic 210 may provide an interactive GUI and customizable sets of libraries, whose components may be assembled and/or modified to design, simulate, and test signal processing, control, communications, and other time-varying systems (Simulink® by The MathWorks). The sets of libraries may represent sources (e.g., signal generator, data source, etc.), sinks (e.g., signal end-points), linear and/or nonlinear components, and/or connectors. If the library does not provide desired blocks, it is also possible to implement the blocks in a programming language (e.g., C, C++, etc.) and import the blocks into the library.

Application logic 210 may include, as its components, core simulation logic, state modeling logic, fixed point logic, code generation logic, validation and verification (VV) logic, toolboxes, and a dynamic test generator. In different implementations, application logic 210 may include additional, fewer, or different components. For example, application logic 210 may include an interpreter via which different components of application logic 210 are compiled, linked and executed.

The core simulation logic may include hardware and/or software based logic for importing, creating, editing, and/or simulating entities and/or models, and may provide an authoring environment for the models, as well as for generating tests. The state modeling logic may include hardware and/or software based logic for designing, editing, and/or simulating finite state machines. The state modeling logic may include components for designing, compiling, linking, and executing graphical state charts.

The fixed-point logic may include hardware and/or software based logic for modeling fixed-point numbers, fixed-point arithmetic, and/or systems that use fixed-point numbers/arithmetic (e.g., 25.00+1.00). For example, the fixed-point logic may include a block that accepts a double-precision number and outputs a two-decimal version of the number (e.g., 20.00, 1.00, etc.).

The code generation logic may include hardware and/or software for converting a model into a program or code in a computer programming language (e.g., C, C++, etc.). In one example, a code generator may accept a model that is created in the core simulation logic and may generate a hardware description language (HDL).

The VV logic may include hardware and/or software based logic for developing tests for programs created in application logic 210, for creating test cases based on requirements, and/or for simulating and testing systems that operate in different computational environments. In creating test cases for entities, the VV logic may provide tools for establishing requirements for simulation models, for associating models to the requirements, for verifying proper function of the model by monitoring model signals during testing, for validating the model by taking all possible decision branches in the model's execution paths, and/or for facilitating analysis of a model by customizing a system for detecting anomalies and inefficiencies in the model. The test cases that are created via the VV logic may be used for dynamically generating tests.

The toolboxes may include different libraries of pre-built components that may be used as building blocks for models. An example of a toolbox may include a video and image processing (VIP) library, which may provide a set of functions and/or programs for image processing, analysis, visualization, and/or development of additional functions.

The dynamic test generator may include hardware and/or software based logic for dynamically generating tests for any polymorphic entity (e.g., a block, a graphical state chart, etc.). In one embodiment, tests may be dynamically generated for entities, which can provide information about themselves and related objects (e.g., polymorphic methods or properties) when examined using facilities that are provided by the core simulation logic. Such facilities may include a known application program interface (API) for function calls to the entities, or may store information about the entities, or may access information about the entities in some other way designed by one of ordinary skill in the art.

The dynamic test generator may test simulation models that are constructed in the core simulation logic by using basic entities that may be provided by application logic 210 or by using entities that are derived from the basic entities (e.g., blocks). Examples of entities for which the dynamic test generator may generate tests and execute the tests may include a mask dialog entity, a textual code entity, a graphical state chart entity, and a model entity. FIGS. 3-6 illustrate each of these entities. Depending on implementation, other types of entities may be tested by the dynamic test generator.

Figure 3:
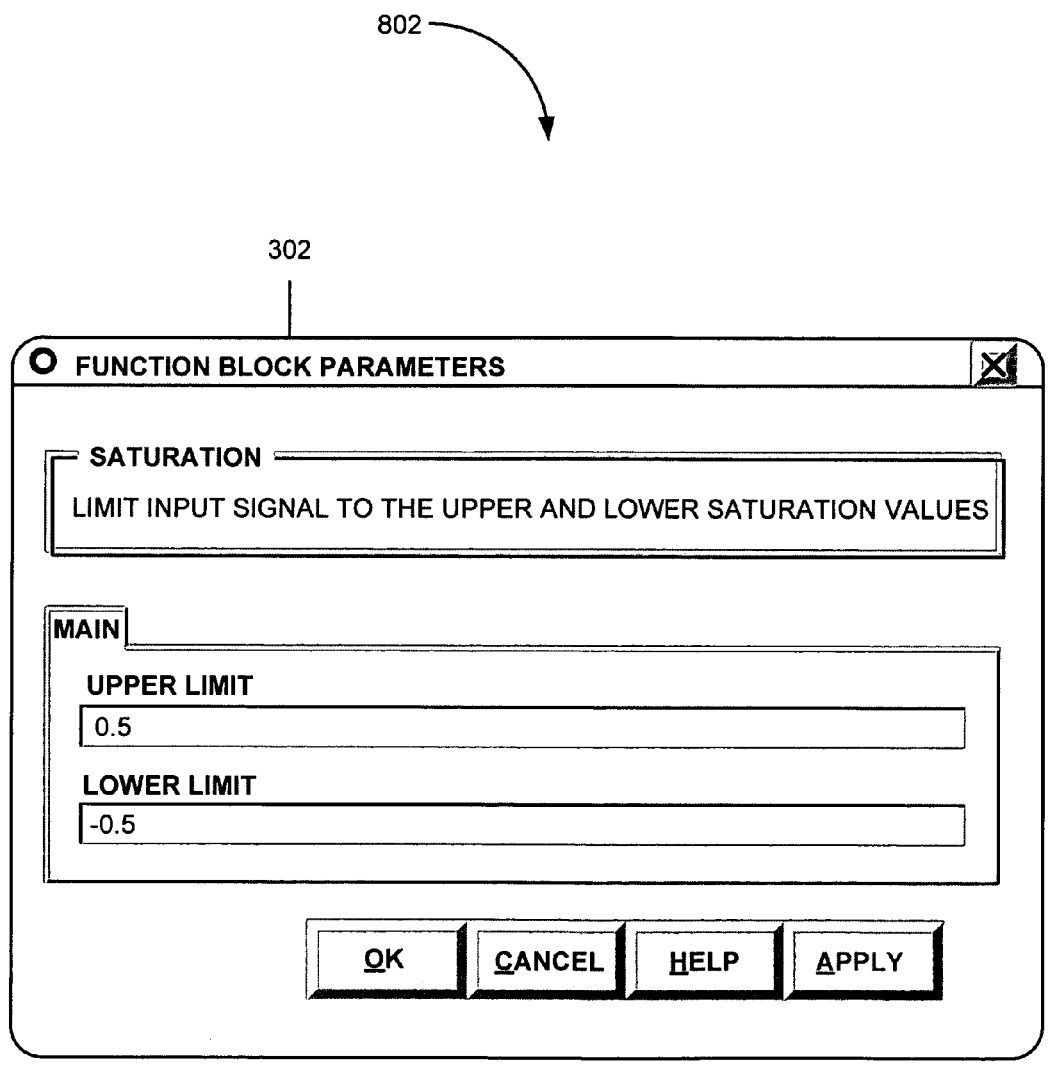
FIG. 3 is a diagram of an exemplary mask dialog entity.

FIG. 3 is a diagram of an exemplary mask dialog entity 302. The term "mask dialog," "mask dialog entity," or simply "mask," as used herein, may refer to a graphical user interface (e.g., a dialog box, a combo box, etc.) for a portion of a model (e.g., a subsystem) that may be created and customized to hide portions of the contents of the model/subsystem. For example, when a subsystem is "masked," the subsystem may appear on a display with its own icon and/or a dialog box for showing and/or editing parameters that are related to the subsystem.

Figure 4:
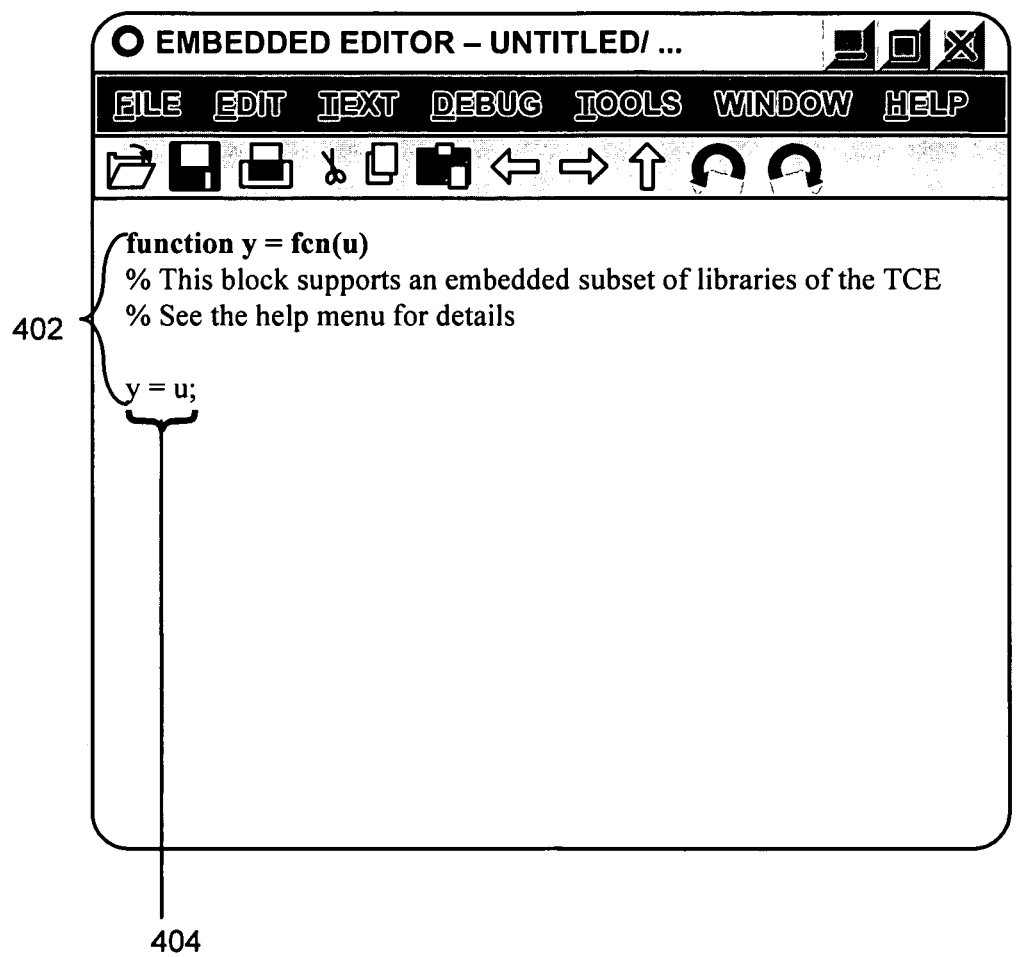
FIG. 4 is a diagram of an exemplary textual code entity.

FIG. 4 is a diagram of an exemplary text code entity. Textual code entity 402 may include one or more portions of code (e.g., a computer program) in a particular programming language. For example, as illustrated in FIG. 4, textual code 402 may include a function 404 written in the MATLAB® programming language (e.g., a language supported by MATLAB® modeling environment).

Figure 5:
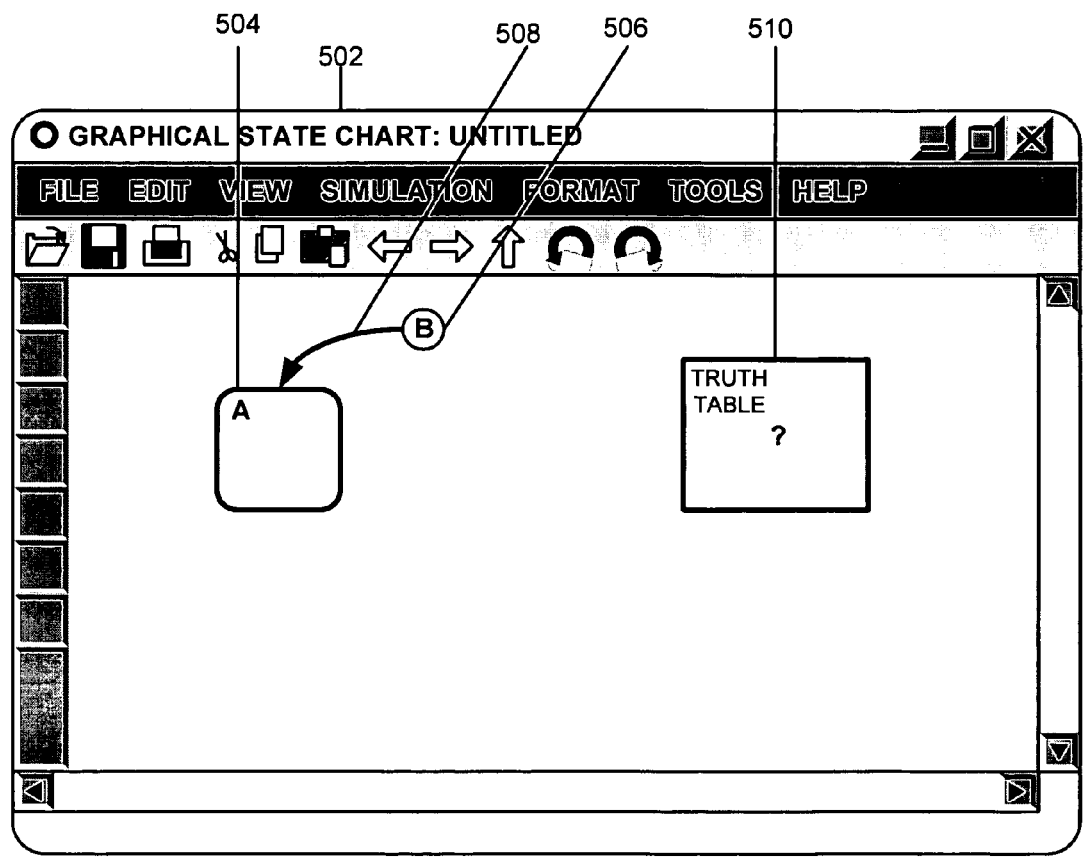
FIG. 5 is a diagram of a graphical state chart entity.

FIG. 5 is a diagram of a graphical state chart entity 502. Graphical state chart entity 502 may be designed and created with state modeling logic and may simulate elements of finite state machines. These elements may represent hierarchical and parallel states of the finite state machines and event-driven transitions between the states. In addition, graphical state chart entity 502 may show inputs that may be accepted and outputs that may be generated by a system if the system changes from one state to another.

In FIG. 5, graphical state chart entity 502 may include a state A 504, a state B 506, a transition arc 508, and a truth table 510. State A 504 and state B 506 may represent two possible states (i.e., modes) that may be attained by a block that is represented by graphical state chart 502. Transition arc 508 may identify states to and from which the block may make transitions. For example, in FIG. 5, transition arc 508 may indicate that the block may transition from state B 506 to state A 504. Truth table 510 may represent a mathematical table that enumerates values of logical expressions (e.g., X AND Y, NOT X, etc.) of mathematical variables that represent the inputs of a block.

Figure 6:
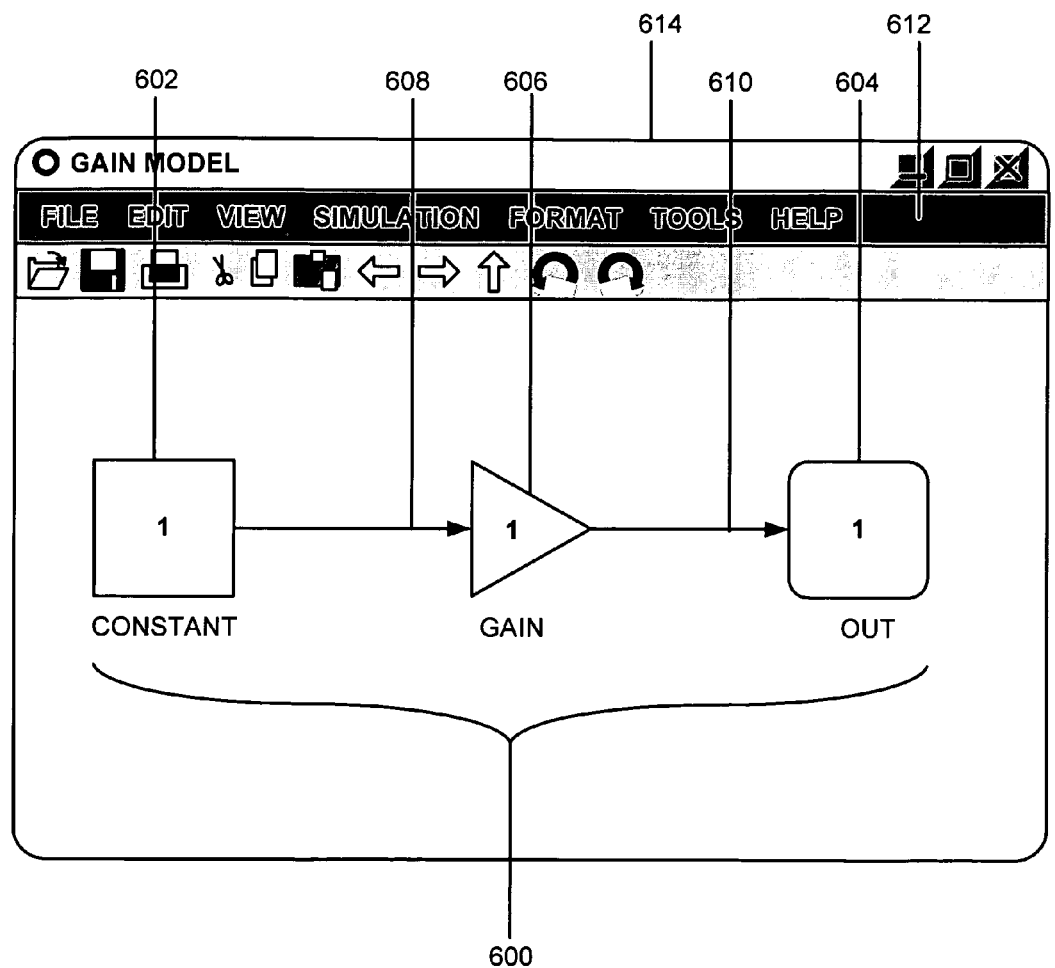
FIG. 6 is a block diagram of a model entity.

FIG. 6 shows an example of a model entity 600. In FIG. 6, model entity 600 is shown as a gain model, which may include a constant block 602, an out block 604, a gain block 606, a connector 608, and/or a connector 610. In FIG. 6, each of the components in gain model 600 may be imported, edited, and interconnected through the use of the core simulation logic. For example, to delete gain block 606, gain block 606 may be selected through a selection command (e.g., clicking on a mouse) and may be deleted via a delete command in menu 612.

Once created, a model entity may be used for simulation. For example, in FIG. 6, the core simulation logic may simulate constant block 602 to output a stream of constant-valued data, may simulate out block 604 to accept values from gain block 606, and/or may simulate gain block 606 to amplify the constant-valued data that it receives from constant block 602 and to output the amplified values.

The dynamic test generator may generate tests for entities, such as mask dialog entity 302, text code entity 402, graphical state chart entity 502, and model entity 600. To create dynamic tests, a set of requirements and/or test cases that are associated with an entity type may be specified using a file and/or a GUI that are provided in the dynamic test generator, for example, by a user, a test designer, etc. If the test cases and/or requirements are specified for an entity, the dynamic test generator may dynamically generate tests and execute the tests.

Figure 7:
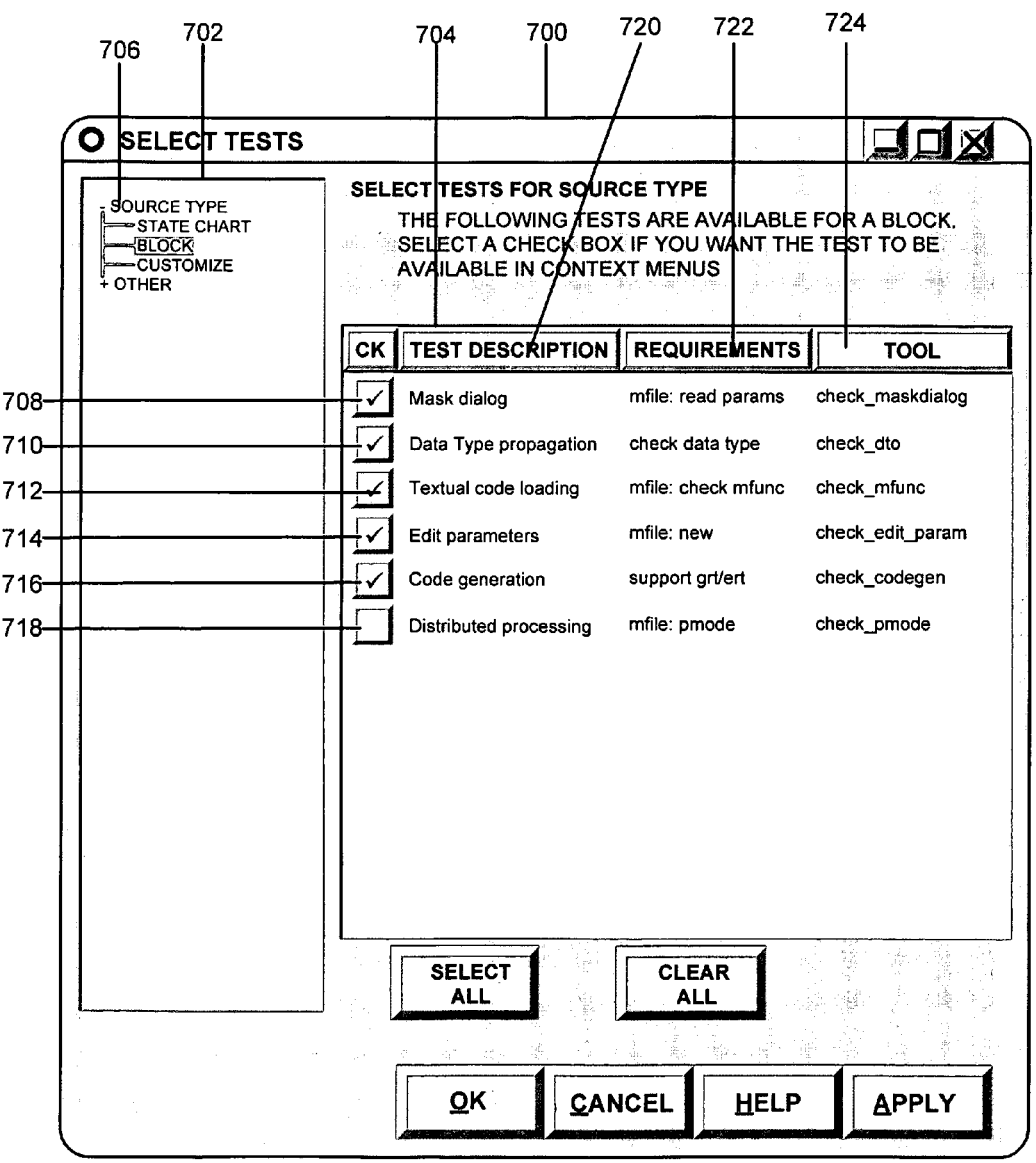
FIG. 7 is a diagram of an exemplary test case selection (TCS) menu.

FIG. 7 is a diagram of an exemplary test case/requirements selection (TCS) menu 700 that may be provided by the dynamic test generator. As shown, TCS menu 700 may include a source-type pane 702 and a TCS pane 704. Source-type pane 702 may list different types or groups of entities in application logic 210. TCS pane 704 may display a list of available test cases for one of the types of groups of entities in source-type pane 702.

For example, as shown in FIG. 7, if "block" item is selected in source-type pane 702, TCS pane 704 may display test cases, such as mask dialog test 708, a data type propagation test 710, a textual code loading test 712, an edit parameters test 714, a code generation test 716, and/or a distributed processing test 718. If another item is selected in source-type pane 702, TCS pane 704 may display different test cases than those depicted in FIG. 7. In practice, TCS pane 704 may include additional, fewer, or different test cases than those shown illustrated in FIG. 7.

Mask dialog test 708 may include a test case for checking the validity of various fields in a mask dialog of a block by comparing them to parameters in the block's subcomponents.

For example, mask dialog test 708 may check if a field in a mask dialog is properly linked to a particular parameter or a variable in a model's subsystem. Data type propagation test 710 may include a test case for checking if one type of data may be converted to another type without encountering a problem. For example, data type propagation test 710 may check if a type of data that is produced at an output terminal of a block may be converted to another type of data that is accepted at an input terminal of another block. Textual coding test 712 may include a test case for checking if a function that is written in a given computer language may be successfully compiled and/or linked with other entities in the core simulation logic. Edit parameters test 714 may include a test case that checks if a user interface accepts a given range of values and/or rejects values that are outside the given range. Code generation test 716 may include a test case for checking if a program in a particular language can be generated from an entity via the code generator. Distributed processing test 718 may include a test case that tests if the address of a designated network node on which a selected entity is to be executed has the proper form of network address.

In different implementations, TCS menu 700 may be configured differently than as illustrated in FIG. 7. For example, source-type pane 702 may include display icons that represent different types of entities, and test case selection pane 704 may display buttons, list boxes, combo boxes, and/or any other types of graphical component that are commonly used to represent a list of selectable items. In another example, test case selection menu 700 may show available test cases under each item in source-type pane 702, and exclude test case selection pane 704.

Figure 8:
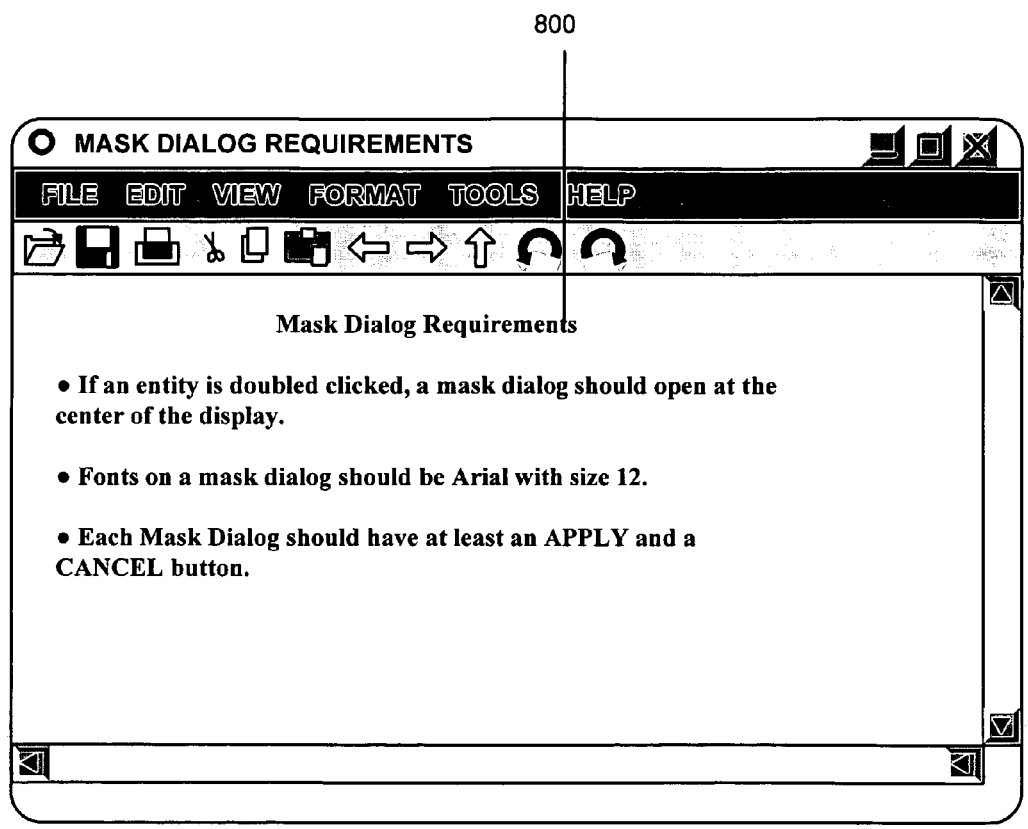
FIG. 8 is an exemplary textual requirement for a mask dialog.
Figure 9:
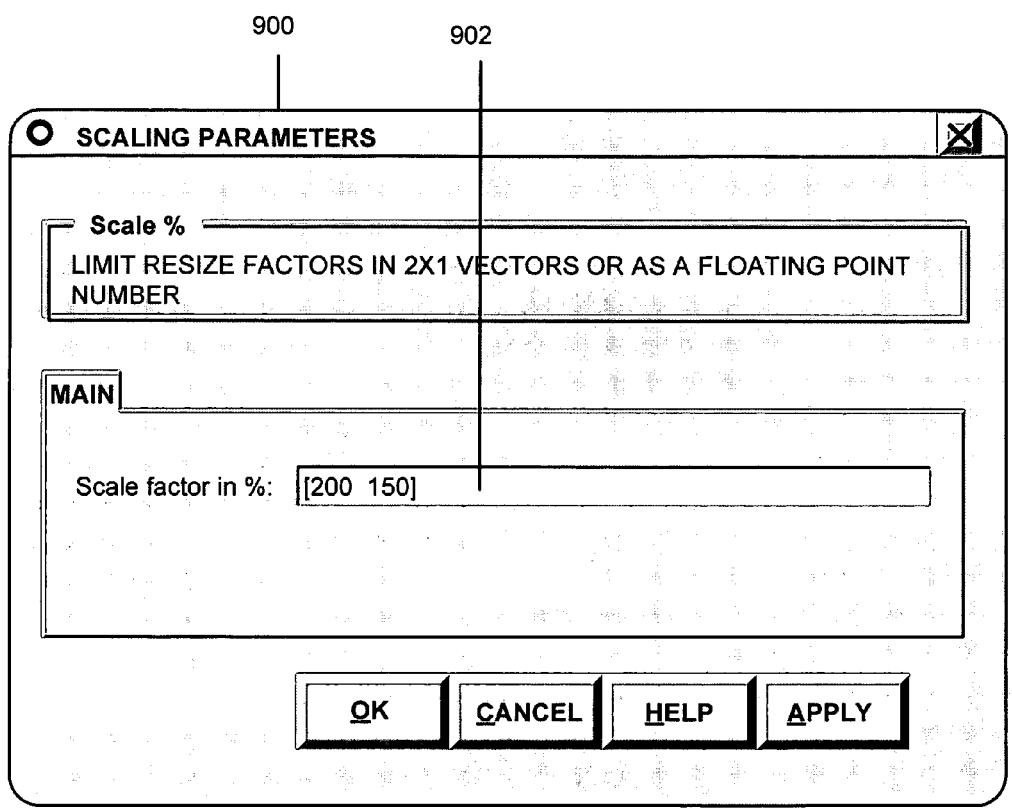
FIG. 9 shows an exemplary mask dialog.

In FIG. 7, for each test case, TCS pane 702 may show a test description field 720, a requirements field 722, and a tool field 724. Test description field 720 may provide a short description of the case. Requirements field 722 may show a link to or a name of different types of requirements, such as a textual requirement, a graphical requirement (e.g., a diagram that illustrates constraints on input), or a logical requirement (e.g., a formal specification). FIG. 8 shows an example of a textual requirement 800 for a mask dialog. FIG. 9 shows the mask dialog 900. In FIG. 8, textual requirement 800 may specify a screen location at which mask dialog 900 may be created, types of buttons the mask dialog may include, and the size and type of font that may be used in different parts of mask dialog 900, such as input field 902.

Tool field 724 may show a link to or the test case that may be used to test the entity. The test cases may be linked to the requirements through facilities in application logic 210, such as the VV logic. The test cases may include positive test cases (e.g., test cases that verify whether an operation yields expected results if the operation is provided with an input within its domain), negative test cases (e.g., test cases that verify whether an operation generates error messages if the operation is provided with input values outside of the domain), and/or formal tests (e.g., tests used for proving a requirement).

Figure 10:
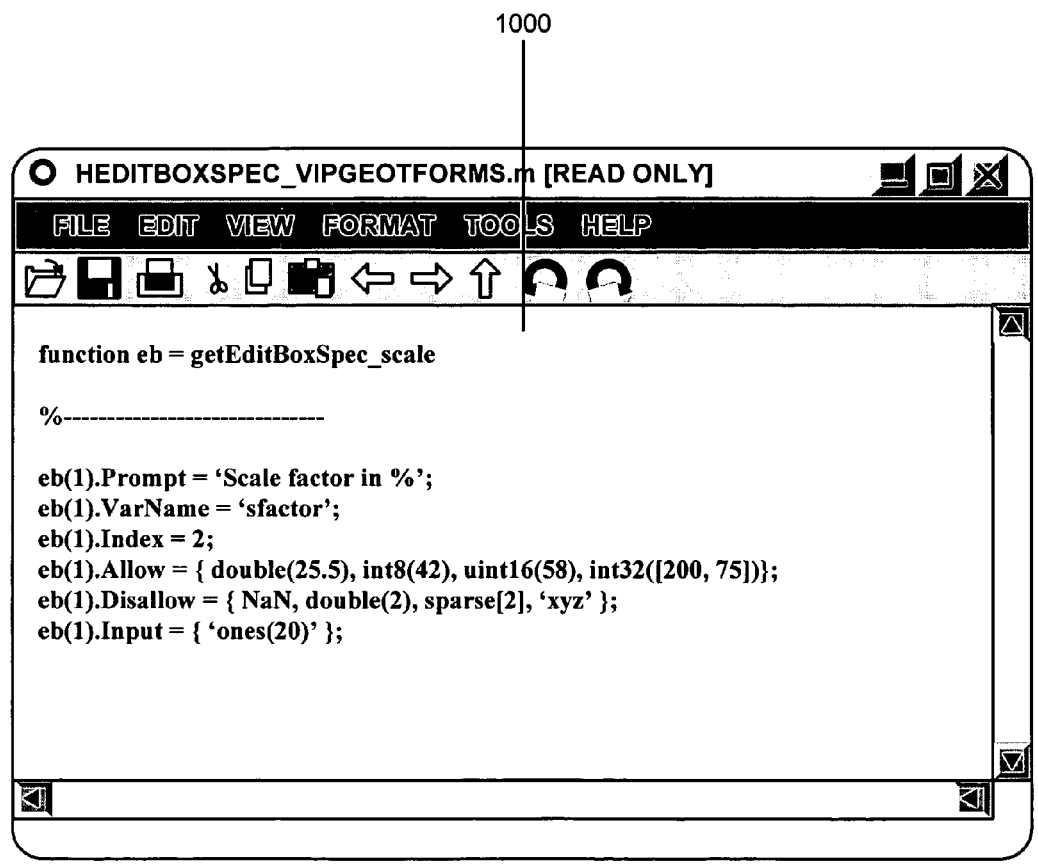
FIG. 10 shows exemplary contents of an exemplary specification file that incorporates formal tests.

FIG. 10 shows examples of formal tests in a specification file 1000. The formal tests in specification file 1000 may test input field 902 of mask dialog 900. As shown in FIG. 10, specification file 1000 may include test expressions (e.g., eb(1).Allow={double(25.5), int8(42), uint16(58), int32 ([200, 75])} and eb(1).Disallow={inf, double(2), sparse[2], 'xyz'}) for performing positive and negative tests on input field 902 for editing parameters.

In FIG. 10, expression "eb(1).Allow={double(25.5), int8 (42), uint16(58), int32([200, 75])}" may specify positive tests on whether double(25.5) (i.e., double precision form of number 25.5), int8(42) (i.e., a byte-precision form of number 42), unit16(58) (i.e., an unsigned, two-byte precision form of integer 58), and int32([200, 75]) (i.e., a 2×1 vector of 32-bit precision integers 200 and 75) are accepted by mask dialog 900 as legitimate scaling factors. In another example, expression "eb(1).Disallow={NaN, double(2), sparse[2], 'xyz'}" may specify performing negative tests on whether NaN (i.e., undefined), double(2) (i.e., double precision form of number 2), sparse[2] (i.e., a 2×2 sparse matrix), and 'xyz' (i.e., a character string) are rejected by mask dialog 900 as improper scaling factors.

If the test cases are specified for an entity by using TCS menu 700, the dynamic test generator may be used to dynamically generate tests and to execute the tests. To allow users to easily and efficiently create tests, the dynamic test generator may provide context menus.

Figure 11:
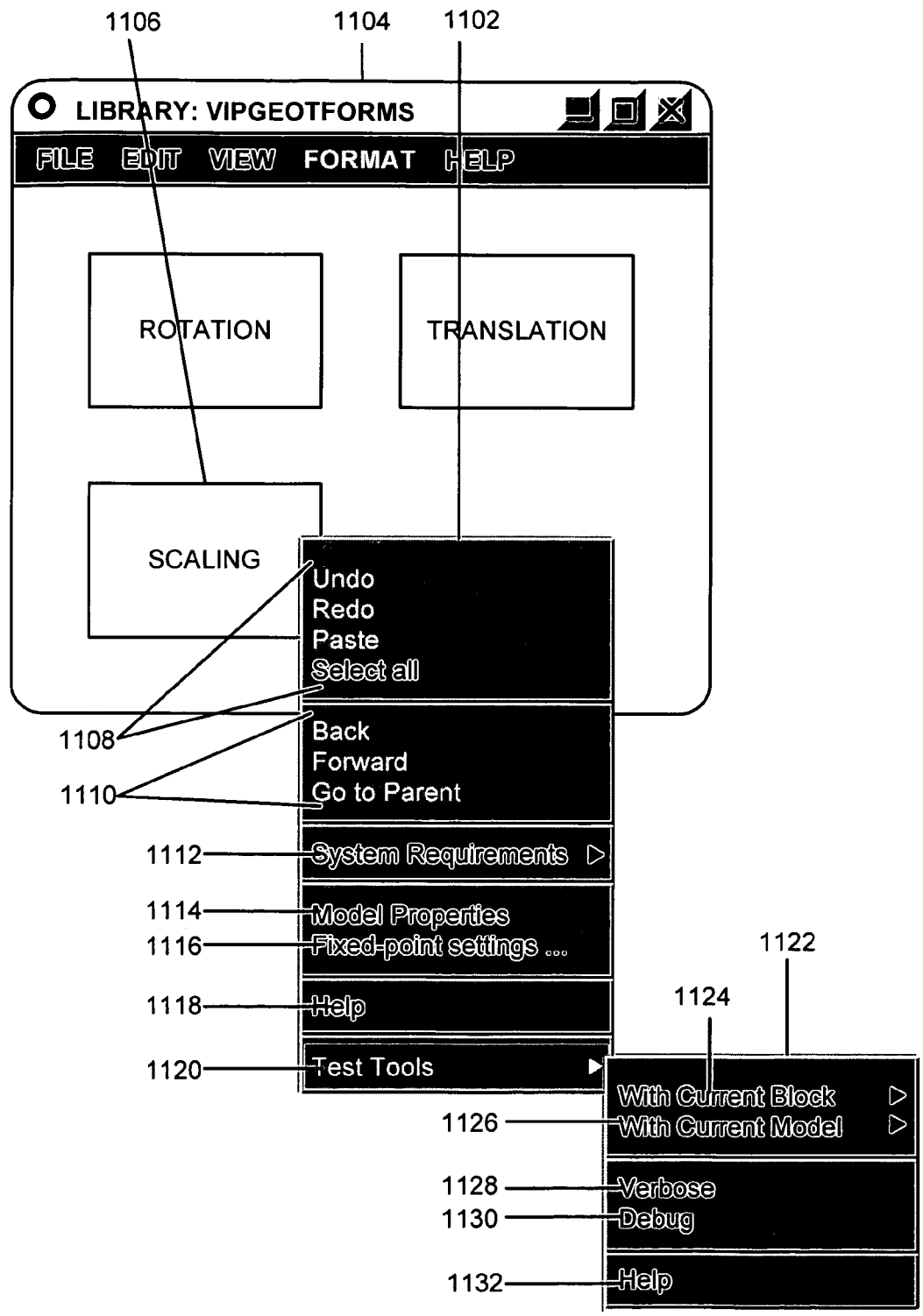
FIG. 11 is an exemplary context menu.

FIG. 11 shows an exemplary context menu 1102 in a window 1104 provided by the core simulation logic. Context menu 1102 may be activated differently depending on implementation. In the implementation illustrated in FIG. 11, context menu 1102 may be activated by right-clicking a mouse when a cursor hovers over an entity (e.g., scaling operator 1106 in the image transformation library). As shown, context menu 1102 may include editing command items 1108 for editing an entity; navigation command items 1110 for changing views of window 1104; a system requirements command item 1112 for viewing submenu items related to editing and associating system requirements for the entity; a model properties item 1114 for viewing and/or editing properties associated with a block or a model; a fixed-point settings item 1116 for viewing and/or changing a precision of a numerical presentation using the fixed-point logic (e.g., a decimal point or number of digits); and a help item 1118 for viewing a help menu related to the entity. In addition, context menu 1102 may include a test tools item 1120 for viewing a submenu related to dynamically generating a test for the entity. In other implementations, context menu 1102 may include additional, fewer, or different menu items than the ones illustrated in FIG. 11.

In FIG. 11, when a mouse cursor moves down context menu 1102 and hovers over test tools item 1120, a test tools submenu 1122 may be displayed. Test tools submenu 1122 may include menu items whose activation may cause other submenus associated with the dynamic testing to appear and/ or to be activated. For example, test tool submenu 1122 may include a with-current-block item 1124, a with-current-model item 1126, a verbose item 1128, a debug item 1130, and a help item 1132. A mouse cursor that hovers over with-current-block item 1124 or with-current-model item 1126 may activate submenus that are associated with dynamically generating tests, as described below. Activating verbose item 1128, debug item 1130, or help item 1132 may cause the dynamic test generator to report dynamic test results in either verbose or brief mode, to modify debugging parameters, or to provide help menus, respectively. In other implementations, test tools submenu 1122 may include additional, fewer, or different menu items than the ones illustrated in FIG. 11.

Figure 12A:
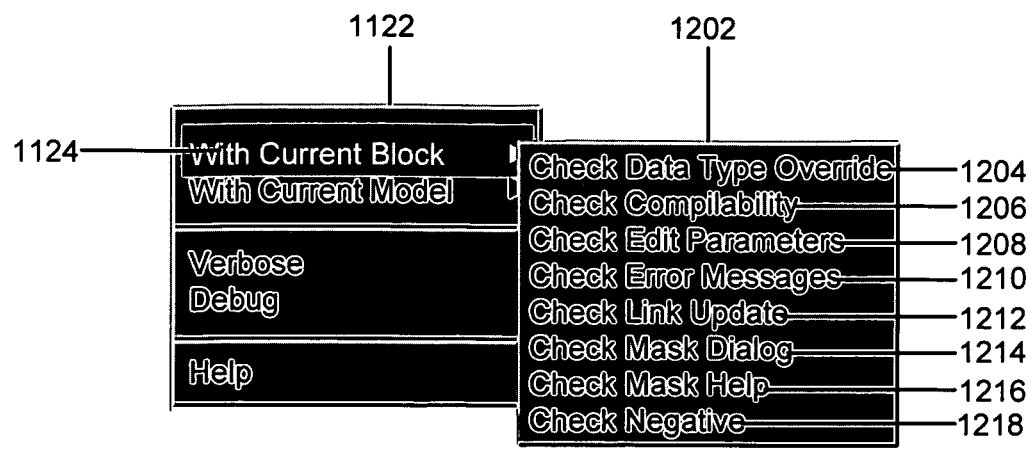
FIG. 12A shows an exemplary block test submenu that may be associated with the exemplary context menu of FIG. 11.

FIG. 12A shows an exemplary block test submenu 1202 that may be activated if with-current-block item 1124 is selected. As shown, block test submenu 1202 may include a check data type override item 1204, a check compilability item 1206, a check edit parameters item 1208, a check error messages item 1210, a check link update item 1212, a check mask dialog item 1214, a check mask help item 1216, and a check negative item 1218. Each item in test submenu 1202 may trigger a piece of code in the dynamic test generator to dynamically generate tests for verification and validation of models.

In FIG. 12A, the list of items in block test submenu 1202 may depend on available test cases that are selected in TCS menu 700 (FIG. 7). For example, if code generation test 716 is unselected in TCS menu 700, test submenu 1202 may not include check compilability item 1206. In another example, if distributed processing test 718 is selected in TCS menu 700, test submenu 1202 may show an item for checking the format of a network address (e.g., a Uniform Resource Locator (URL), a Uniform Resource Identifier (URI), an IP address, etc.) that is associated with each subcomponent of the entity.

In block test submenu 1202, check data type override item 1204 may test if a data type override mechanism may allow the type of data that is outputted from an output terminal of a block may be inputted into an input terminal that accepts data of a different type. For example, if the type of data from an output terminal is single precision number, and the type of data that is accepted at an input terminal that is connected to the output terminal is double precision number, the data type override mechanism may force the output terminal to produce double precision numbers. Check compilability item 1206 may be selected to test if a model can be compiled into a selected computer language (e.g., C, C++, Java, etc.). Check edit parameters 1208 may be selected to test if a menu for editing parameters operates correctly (e.g., a parameter that is edited is in a proper range of values). Check error messages 1210 may be selected to test if there are exceptions or error messages that may be generated during a simulation (e.g., divide by zero error, overflow error, etc.). Check link update item 1212 may be selected to test if textual code can be loaded (i.e., linked in with other entities). Check mask dialog item 1214 may be selected to test for the validity of various fields in a mask dialog of a block. Check mask help item 1216 may be selected to test if a help menu can be properly invoked from within a mask dialog. Check negative item 1218 may be selected to test if an input value that is outside of input range may be properly rejected.

Figure 12B:
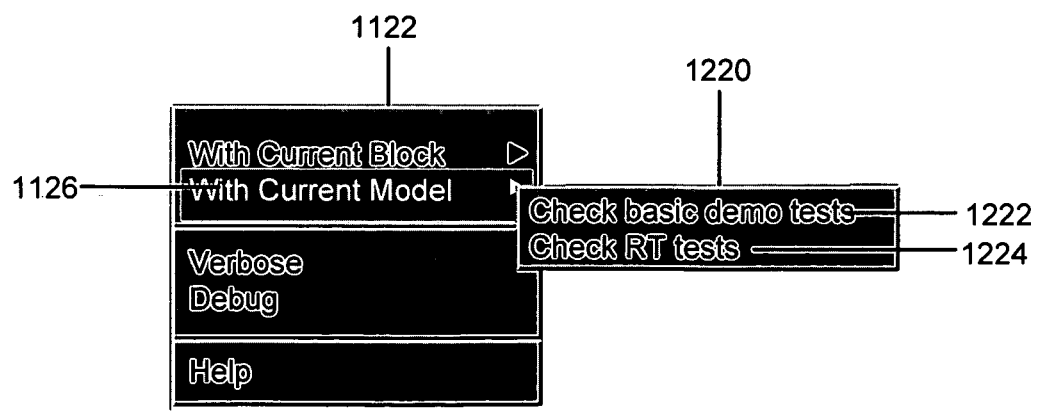
FIG. 12B shows an exemplary model test submenu that may be associated with the exemplary context menu of FIG. 11.

FIG. 12B shows a model test submenu 1220 that may be activated when with-current-model item 1126 is selected. As shown, model test submenu 1220 may include check basic demo test item 1222 for testing a model with a set of generic tests that may be provided by the dynamic test generator. In addition, model test submenu 1220 may include check Real Time (RT) test item 1224 for testing code performance.

Many of the test items in FIGS. 12A and 12B may be activated to dynamically generate tests and to execute the test. During the generation and the execution of the tests, messages and test results that are associated with the generation and execution of the test may be recorded in a test report and in a test log.

FIG. 13 shows test results that are recorded in a test report. Exemplary test report 1300 may be generated by performing a test for scaling operator 1106 (FIG. 11) and, as shown, may include a test case field 1302, a run field 1304, a status field 1306, and a comments field 1308. Test case field 1302 may include the name of a test case (e.g., the test case names provided in TCS pane 704 of FIG. 7) and a link to a document or resource in which requirements that are associated with the test case are defined (e.g., textual requirement 800 for mask dialog 900). Run field 1304 may indicate whether a particular test case has run (e.g., "Y" may indicate a test has run, and "N" may indicate the test has not run).

Comments field 1306 may include information from other components of application logic 210 (e.g., the VV logic) or the test. Status field 1308 may indicate whether a test passed or failed. In addition status field 1308 may provide a link to a test log for the tests.

Figure 14:
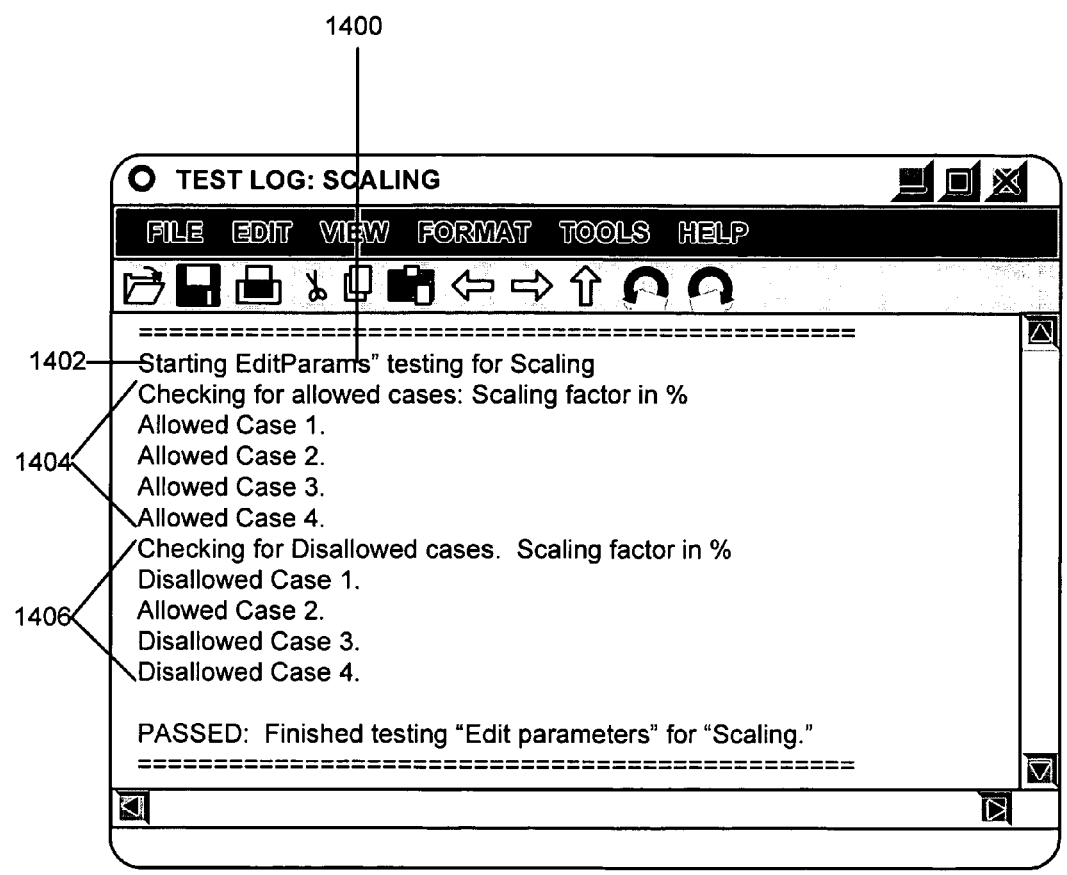
FIG. 14 shows an exemplary test log from testing the exemplary mask dialog of FIG. 9.

FIG. 14 shows an exemplary test log 1400 that may be produced during the generation and the execution of the test. Test log 1400 may be generated by testing for mask dialog 900 (FIG. 9). More specifically, test log 1400 may be generated by testing scaling operator 1106 (FIG. 11). The tests may be based on the formal tests that are incorporated in specification file 1000.

As shown, line 1402 of test log 1400 may indicate that test log 1400 is generated from an edit parameters test that is associated with check edit parameters item 1208 (e.g., "Starting EditParams testing for Scaling"). Lines 1404 may indicate that a positive test "eb(1).Allow={double(25.5), int8(42), uint16(58), int32([200, 75])}" in FIG. 10 has been tested (e.g., "Checking for allowed cases: Scaling factor in %"). In addition, lines 1404 may indicate that mask dialog 900 may have allowed input cases for the positive test (e.g., double (25.5), int8(42), uint16(58), and. int32[200, 75]). Lines 1406 may indicate that a negative test "eb(1).Disallow=double(2)" in FIG. 10 has been tested. In addition, lines 1406 may indicate that mask dialog 900 may have disallowed input cases for three negative tests (e.g., NaN, sparse[2], and 'xyz').

Exemplary Process for Dynamically Generating Tests

Figure 15:
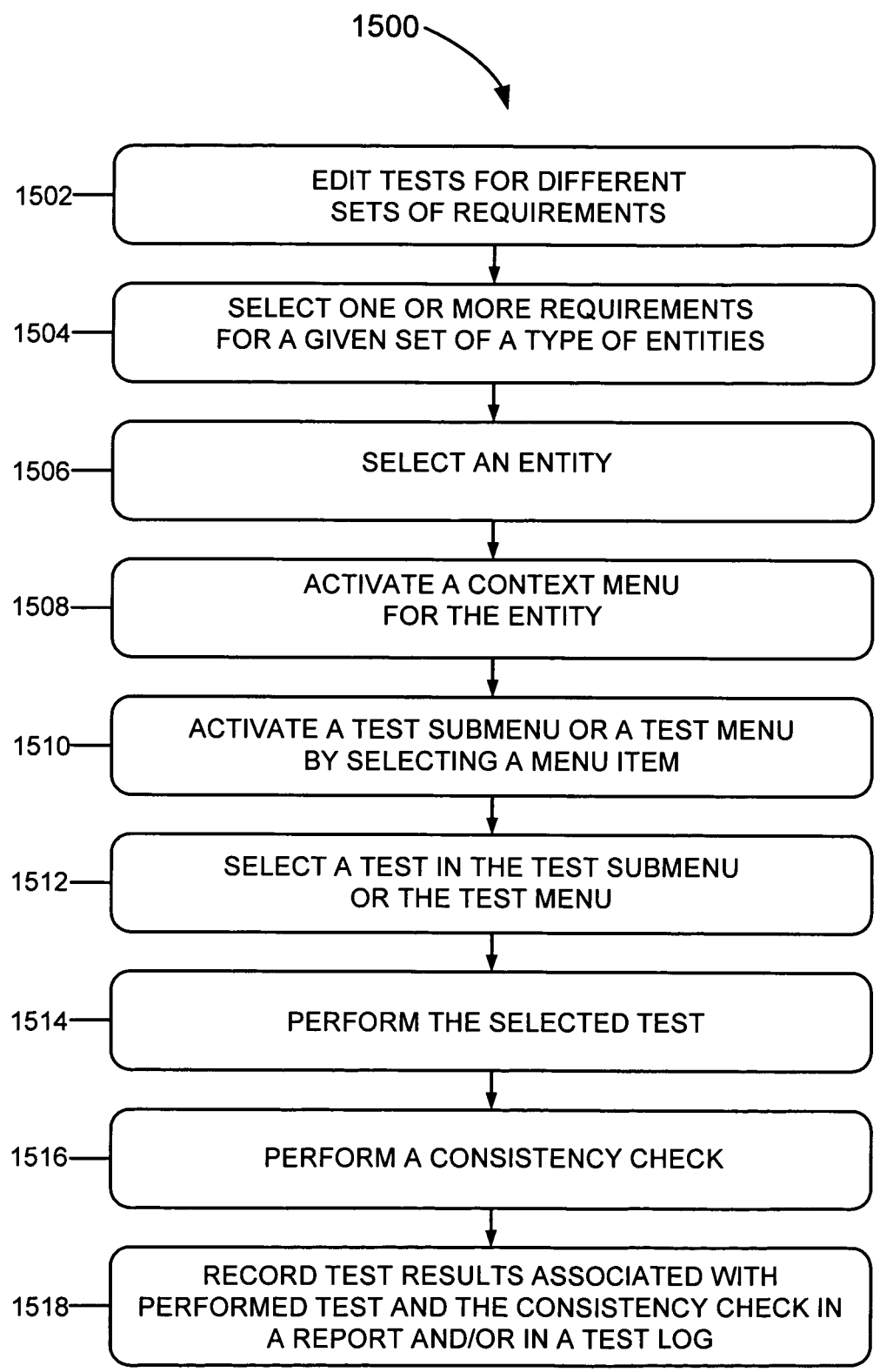
FIG. 15 is a flowchart of an exemplary process for dynamically generating tests.

FIG. 15 is a flowchart of an exemplary process 1500 for dynamically generating tests. Process 1500 may start with editing (e.g., creating, modifying, deleting, etc.) test cases for different sets of requirements (act 1502). The test cases may be linked to the requirements through facilities in application logic 210, such as the VV logic. In addition, the test cases may include positive test cases (e.g., test cases that verify whether an operation yields expected results if the operation is provided with an input within its domain), negative test cases (e.g., test cases that verify whether an operation generates error messages if the operation is provided with input values outside of the domain), and/or formal tests (e.g., tests used for proving a requirement), as described above in connection with FIGS. 10 and 11.

One or more requirements for a given set or a type of entities may be selected (act 1504). For example, as described above in connection with FIG. 7, one or more requirements in TCS pane 704 may be selected for an entity type that is shown in source-type pane 702.

An entity may be selected (act 1506). For example, as described above in connection with FIG. 11, when a mouse cursor floats over an entity that is to be tested dynamically, the entity may be selected. The entity may be selected during a design process or a modeling process.

A context menu for the entity may be activated (act 1508). For example, as described in connection with FIG. 15, the context menu may be activated when a cursor hovers over the entity and a mouse is right-clicked.

A test submenu or a test menu (i.e., a menu that lists different tests for the entity) may be activated by selecting a menu item (i.e., an item in the context menu or in a submenu that is accessed through the context menu) for activating the test menu (act 1510). For example, as described above with reference to FIG. 11, context menu 1102 may include test tools item 1120. If a mouse cursor moves down context menu 1102 and hovers near test tools item 1120, test tools submenu 1122 may be displayed. Test tools submenu 1122 may include with-current-block item 1124. A mouse cursor that hovers over with-current-block item 1124 may activate test submenus 1202 (FIG. 12A).

As further shown in FIG. 15, a test in the test submenu or the test menu may be selected (act 1512). For example, in one implementation, as described above in connection with FIG. 12A, test submenu 1202 may include a list of menu items (e.g., check data type override item 1204, a check compilability item 1206, a check edit parameters item 1208, etc.). A test associated with a menu item in the list may be selected if a mouse cursor hovers over the menu item and the mouse is right-clicked.

The selected test may be performed (act 1514). In one implementation, selecting the test may cause the test to be generated and performed automatically. In addition, depending on the selected test, generating and performing the test may involve a different set of procedures. In one example, generating and performing the test may include compiling the selected entity and/or test entities to produce compiled code, linking the compiled code to generate linked code, and executing the linked code. If generating/performing the test involves only compilation (e.g., compilability test), generating/performing the test may not involve the execution of the linked code.

At act 1516, a consistency check may be performed. A consistency check may test whether a subset of the entity's subcomponents operates within previously validated inputs and/or if each subcomponent operates optimally. In safety critical applications, the user may want to define a subset of behaviors that are defined by inputs and outputs. In such cases, the consistency check can ensure that the entity polymorphic behavior is not outside of the selected subset.

In many implementations, the consistency check may be automatically generated and performed together with the selected test. In a different implementation, the consistency check may be selected and activated from a context menu, in a manner similar to selecting and activating a test.

As further shown in FIG. 15, test results that are associated with the performed test and the consistency check may be recorded in test report 1300 (FIG. 13) and in test log 1400 (FIG. 14) (act 1518). The test results may be produced while compiling, linking, or executing the test. In many implementations, the test results may be recorded so that they can be isolated from other test results in the report and traced to the test.

EXAMPLE

The following example illustrates processes involved in dynamically generating tests for validating the computational and simulation tasks that are associated with entities, with reference to FIGS. 2, 7-11, 12A, 12B, and 13. The example is consistent with the exemplary process described above in connection with FIG. 15.

In the example, assume that a user of device 200 (FIG. 2) is designing a scaling operator 1106 as shown in FIG. 11. In addition, assume that the user has been implementing tests using the VV logic. During the design of scaling operator 1106, when the user makes changes to mask dialog 900 (FIG. 9) for scaling operator 1106, the user wishes to immediately test the changes.

To facilitate validation of mask dialog 900 and to expedite debugging, the user may open TCS menu 700 and may select requirements that are associated with mask dialog 900. For example, the user may select requirements that are associated with formal test 1000 (FIG. 10), such as textual requirement 800 (FIG. 8).

To dynamically test mask dialog 900, the user may select scaling operator 1106 (FIG. 11) and may activate test tools submenu 1120 via context menu 1102. From test tools submenu 1120, the user may select with-current-block item 1124 and may select check edit parameters item 1208 (FIG. 12A) in block test submenu 1202. Selecting check edit parameters item 1208 may cause the corresponding test to be dynamically generated and executed.

Test results from executing the test may be recorded in report 1300. The user may cross-references various items in report 1300 against test log 1400 to make determinations with respect to the performed test. For example, the user may determine that scaling operator 1106 is well designed based on the testing results, and proceed to design additional blocks, using scaling operator 1106 as a building block. For example, the user may design blocks for an image transformation library. The user may have confidence that scaling operator 1106 has been validated against the requirements when designing the additional blocks.

Exemplary System for Dynamic Test Generation

Figure 16:
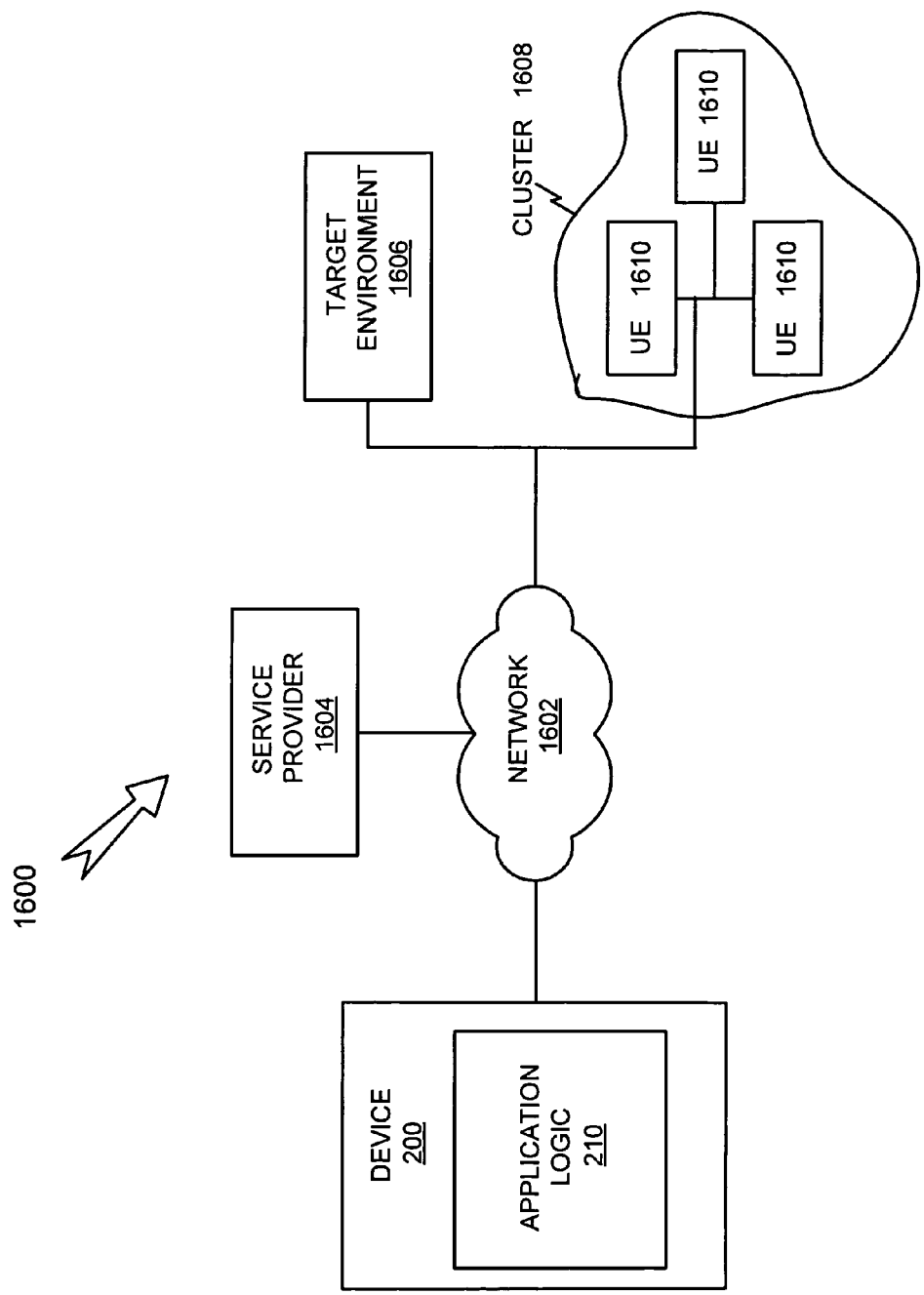
FIG. 16 illustrates an exemplary system in which a device of FIG. 2 may be implemented.

FIG. 16 illustrates an exemplary system 1600 in which device 200 may be implemented. System 1600 may include device 200, network 1602, service provider 1604, target environment 1606, and cluster 1608. The embodiment of FIG. 16 is exemplary, and other embodiments can include more devices, fewer devices, or devices in arrangements that differ from the arrangement of FIG. 16. For example, device 200 may be implemented as a stand-alone device.

Device 200 may include application logic 210 as discussed previously in connection with FIG. 2. In some implementations, application logic 210 may be implemented as stand-alone application logic or as part of a technical computing environment (TCE).

Generally, a TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, optimization, etc.). In another implementation, the TCE may provide these functions as block sets (e.g., an optimization block set). In still another implementation, the TCE may provide these functions in another way, such as via a library, etc.

The TCE may be implemented as a text based environment, a graphically based environment, or another type of environment, such as a hybrid environment that is both text and graphically based. A text-based TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

A graphically based TCE may be implemented using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

A hybrid based TCE may be implemented as an environment that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards, etc.).

In addition to the above implementations of the TCE, the TCE may be implemented as a language that is compatible with a product that includes another TCE. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to perform optimizations on one or more units of execution.

Returning to FIG. 16, network 1602 may transport data from a source to a destination. Embodiments of network 1602 may use network devices, such as routers, switches, firewalls, and/or servers (not shown) and connections (e.g., links) to transport data. "Data," as used herein, may refer to any type of machine-readable information having substantially any format that may be adapted for use in one or more networks and/or with one or more devices (e.g., device 200, service provider 1604, etc.). Data may include digital information or analog information. Data may further be packetized and/or non-packetized.

Network 1602 may be a hardwired network using wired conductors and/or optical fibers and/or may be a wireless network using free-space optical, radio frequency (RF), and/or acoustic transmission paths. In one implementation, network 1602 may be a substantially open public network, such as the Internet. In another implementation, network 1602 may be a more restricted network, such as a corporate virtual network. Implementations of networks and/or devices operating on networks described herein are not limited to any particular data type, protocol, architecture/configuration, etc.

Service provider 1604 may include logic that makes a service available to another device. For example, service provider 1604 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

In one implementation, the customer may receive services on a subscription basis. A subscription may include substantially any type of arrangement, such as monthly subscription, a per-use fee, a fee based on an amount of information exchanged between the provider and the customer, a fee based on a number of processor cycles used by the customer, a fee based on a number of processors, UEs 1610, clusters 1608, etc., usage by the customer, etc.

Target environment 1606 may include a device that receives information over network 1602. For example, target environment 1606 may be a device that receives optimization results from device 200. In one embodiment, target device 1606 may use the optimization results to perform an operation, such as a display operation, a storage operation, a displacement operation (e.g., moving a robotic arm), etc.

Cluster 1608 may include a number of units of execution (UEs) 1610 and may perform processing on behalf of device 200 and/or another device, such as service provider 1604. For example, in one embodiment cluster 1608 may perform parallel processing on an optimization problem received from device 200 and/or application logic 210. Cluster 1608 may include UEs 1610 that reside on a single device or chip or that reside on a number of devices or chips.

UEs 1610 may include processing a hardware unit of execution and/or a software unit of execution. The hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores and in another implementation, the hardware unit of execution may include a number of processors. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

The software unit of execution may include a software resource (e.g., a technical computing environment [e.g., MATLAB software], a worker, a lab, etc.) that performs and/or participates in parallel programming activities. For example, a software unit of execution may perform and/or participate in parallel programming activities in response to a receipt of a program and/or one or more portions of the program. A software unit of execution may perform and/or participate in substantially any type of parallel programming using one or more hardware units of execution.

The types of parallel processing in which UEs participate may include any type of processing that can be distributed across two or more resources (e.g., software units of execution, hardware units of execution, processors, microprocessors, clusters, labs, etc.) and be performed at substantially the same time.

For example, in one implementation, parallel programming may include task parallel programming where a number of tasks are processed at substantially the same time on a number of software units of execution. In task parallel programming, each task may be processed independently of other tasks executing at the same time (e.g., a first software unit of execution executing a first task may not communicate with a second software unit of execution executing a second task). In another implementation, parallel programming may include data parallel programming, where data (e.g., a data set) is parsed into a number of portions that are executed in parallel using two or more software units of execution. In data parallel programming, the software units of execution and/or the data portions may communicate with each other as processing progresses. In still another implementation, parallel programming may include stream parallel programming (also referred to as pipeline parallel programming). Stream parallel programming may use a number of software units of execution arranged in series (e.g., a line) where a first software unit of execution produces a first result that is fed to a second software unit of execution that produces a second result. Stream parallel programming may also include a state where task allocation may be expressed in a directed acyclic graph (DAG) or a cyclic graph with delays). Other implementations may combine two or more of task, data, or stream parallel programming techniques alone or with other types of processing techniques to form hybrid-parallel programming techniques.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of acts have been described with regard to process of FIG. 15, the order of the acts may be modified. For example, act 1502 may be performed after other acts 1502-1516, or may be omitted if default tests are provided by the dynamic test generator. If reports are not needed, act 1516 may be omitted. In addition, non-dependent acts in process 1500 may be performed in parallel to other acts. For example, test results may be recorded in a report at act 1516 while a test is being performed at act 1514.

It will be apparent that aspects described herein may be implemented in many different forms of software, firmware, and hardware in the implementations illustrated in the figures. The actual software code or specialized control hardware used to implement aspects should not be construed as limiting. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A non-transitory computer-readable medium storing instructions, the instructions comprising:
   one or more instructions, executable by at least one processor, to receive a request to test information associated with a model;
   one or more instructions, executable by the at least one processor, to provide, for presentation and based on the received request, a list of tests associated with the model;
   one or more instructions, executable by the at least one processor, to receive a selection of at least one test of the tests;
   one or more instructions, executable by the at least one processor, to associate the selection with an entity, of a plurality of entities;
   one or more instructions, executable by the at least one processor, to receive a selection of the entity;
   one or more instructions, executable by the at least one processor, to generate a menu, including a plurality of first options, for the selected entity,
      the plurality of first options being based on the selected entity;
   one or more instructions, executable by the at least one processor, to provide, for presentation, the generated menu and the selected entity in a screenshot;
   one or more instructions, executable by the at least one processor, to receive a selection of a first option of the plurality of first options;
   one or more instructions, executable by the at least one processor, to generate a submenu, associated with the selected first option, that includes one or more second options,
      the one or more second options including the selected at least one test, and
      the one or more second options being based on the selected entity and being based on the selected first option;
   one or more instructions, executable by the at least one processor, to provide, for presentation, the generated submenu, the generated menu, and the selected entity in the screenshot;
   one or more instructions, executable by the at least one processor, to receive a selection of a first one of the one or more second options;
   one or more instructions, executable by the at least one processor, to perform a first operation based on the selected first one of the one or more second options; and
   one or more instructions, executable by the at least one processor, to output a result of the first operation.

2. The computer-readable medium of claim 1, where the result of the first operation is a failed operation and the instructions further comprise:
   one or more instructions to provide, for presentation, information that indicates a reason for the failed operation.

3. The computer-readable medium of claim 1, where the result includes:
  information for identifying a point of failure within the entity.

4. The computer-readable medium of claim 1, where the plurality of options include at least one of:
  a test for determining whether a block can be compiled into a set of code in a computer language;
  a test for determining whether the entity accepts values in a domain; or
  a test for determining whether the entity rejects values outside of the domain.

5. The computer-readable medium of claim 1, where the instructions further comprise:
  one or more instructions to run a consistency check that is associated with the entity.

6. A computing device-implemented method comprising:
  receiving a request to test information associated with a model,
    the receiving being performed by the computing device;
  providing, for presentation and based on the received request, a list of tests associated with the model,
    the providing, for presentation, being performed by the computing device;
  receiving a selection of at least one test of the tests,
    the receiving the selection of at least one test of the tests being performed by the computing device;
  associating the selection with an entity, of a plurality of entities,
    the associating being performed by the computing device;
  receiving a selection of the entity,
    the receiving the selection of the entity being performed by the computing device;
  generating a menu, including a plurality of first options, for the selected entity,
    the plurality of first options being based on the selected entity, and
    the generating being performed by the computing device;
  providing, for presentation, the generated menu and the selected entity in a screenshot,
    the providing for presentation being performed by the computing device;
  receiving a selection of a first option of the plurality of first options,
    the receiving the selection of the first option being performed by the computing device;
  generating a submenu, associated with the selected first option, that includes one or more second options,
    the one or more second options including the selected at least one test,
    the one or more second options being based on the selected entity and being based on the selected first option, and
    the generating the submenu being performed by the computing device;
  providing, for presentation, the generated submenu, the generated menu, and the selected entity in the screenshot,
    the providing for presentation the generated submenu, the generated menu, and the selected entity being performed by the computing device;
  receiving a selection of a first one of the one or more second options,
    the receiving the selection of the first one of the one or more second options being performed by the computing device;
  performing a first operation based on the selected first one of the one or more second options,
    the performing being performed by the computing device; and
  outputting a result of the first operation,
    the outputting being performed by the computing device.

7. The computing device-implemented method of claim 6, where outputting the result of the first operation further comprises:
  outputting a test report that includes the result.

8. The computing device-implemented method of claim 7, further comprising:
  linking a log to the test report.

9. The computing device-implemented method of claim 6, further comprising:
  providing a link to one of the one or more second options.

10. The computing device-implemented method of claim 6, where performing the first operation includes at least one of:
  validating the result of the first operation against one or more requirements; or
  discovering one or more errors associated with the entity.

11. The computing device-implemented method of claim 10, where performing the first operation further includes:
  determining whether one or more subcomponents of the entity accept or output one or more values that are within validated ranges.

12. The computing device-implemented method of claim 10, where performing the first operation further includes:
  generating a report that indicates whether one or more subcomponents of the entity accept or output one or more values within the validated ranges.

13. A device comprising:
  one or more processors to:
    receive a request to test information associated with a model,
    provide, for presentation and based on the received request, a list of tests associated with the model,
    receive a selection of at least one test of the tests,
    associate the selection with an entity, of a plurality of entities,
    receive a selection of the entity,
    generate a menu, including a plurality of first options, for the selected entity,
      the plurality of first options being based on the selected entity,
    provide, for presentation, the generated menu and the selected entity in a screenshot,
    receive a selection of a first option of the plurality of first options,
    generate a submenu, associated with the selected first option, that includes one or more second options,
      the one or more second options including the selected at least one test, and
      the one or more second options being based on the selected entity and being based on the selected first option,
    provide, for presentation, the generated submenu, the generated menu and the selected entity in the screenshot,
    receive selection of a first one of the one or more second options, perform a first operation based on the selected first one of the one or more second options, and output a result of the first operation.

14. A system comprising:

one or more devices to:

receive a request to test information associated with a model;

provide, for presentation and based on the received request, a list of tests associated with the model;

receive a selection of at least one test, of the list of tests;

associate the selection with an entity, of a plurality of entities;

receive a selection of the entity;

generate a menu, including a plurality of first options, for the selected entity, the plurality of first options being based on the selected entity;

provide, for presentation, the generated menu and the selected entity in a screenshot;

receive a selection of a first option of the plurality of first options;

generate a submenu, associated with the selected first option, that includes one or more second options, the one or more second options including the selected at least one test, and the one or more second options being based on the selected entity and being based on the selected first option;

provide, for presentation, the generated submenu, the generated menu and the selected entity in the screenshot;

receive a selection of a first one of the one or more second options;

perform a first operation based on the selected first one of the one or more second options; and output a result of the first operation.

15. The system of claim 14, where the one or more devices are further to:

receive a selection of a second one of the one or more second options;

perform a second operation based on the selected second one of the one or more second options; and output a result of the second operation.

16. The system of claim 14, where the result of the first operation is a failed operation, and the one or more devices are further to:

provide, for presentation, information that indicates a reason for the failed operation.

17. The computer-readable medium of claim 1, where the instructions further comprise:

one or more instructions to receive a selection of a second one of the one or more second options;

one or more instructions to perform a second operation based on the selected second one of the one or more second options; and one or more instructions to output a result of the second operation.

18. The computing device-implemented method of claim 6, further comprising:

receiving a selection of a second one of the one or more second options;

performing a second operation based on the selected second one of the one or more second options; and outputting a result of the second operation.

19. The computing device-implemented method of claim 6, where the result of the first operation is a failed operation, and the method further comprises:

providing, for presentation, information that indicates a reason for the failed operation.

20. The computing device-implemented method of claim 6, further comprising:

running a consistency check that is associated with the entity.

21. The device of claim 13, where the one or more processors are further to:

receive a selection of a second one of the one or more second options;

perform a second operation based on the selected second one of the second options; and output a result of the second operation.

22. The device of claim 13, where the result of the first operation is a failed operation, and the one or more processors are further to:

provide, for presentation, information that indicates a reason for the failed operation.

23. The device of claim 13, where the result includes information for identifying a point of failure within the entity.

* * * * *